Oct. 9, 1934.　　　W. G. NAGEL　　　1,976,266
AUXILIARY LIQUID LEVEL INDICATING MEANS
Filed March 7, 1932　　3 Sheets-Sheet 1
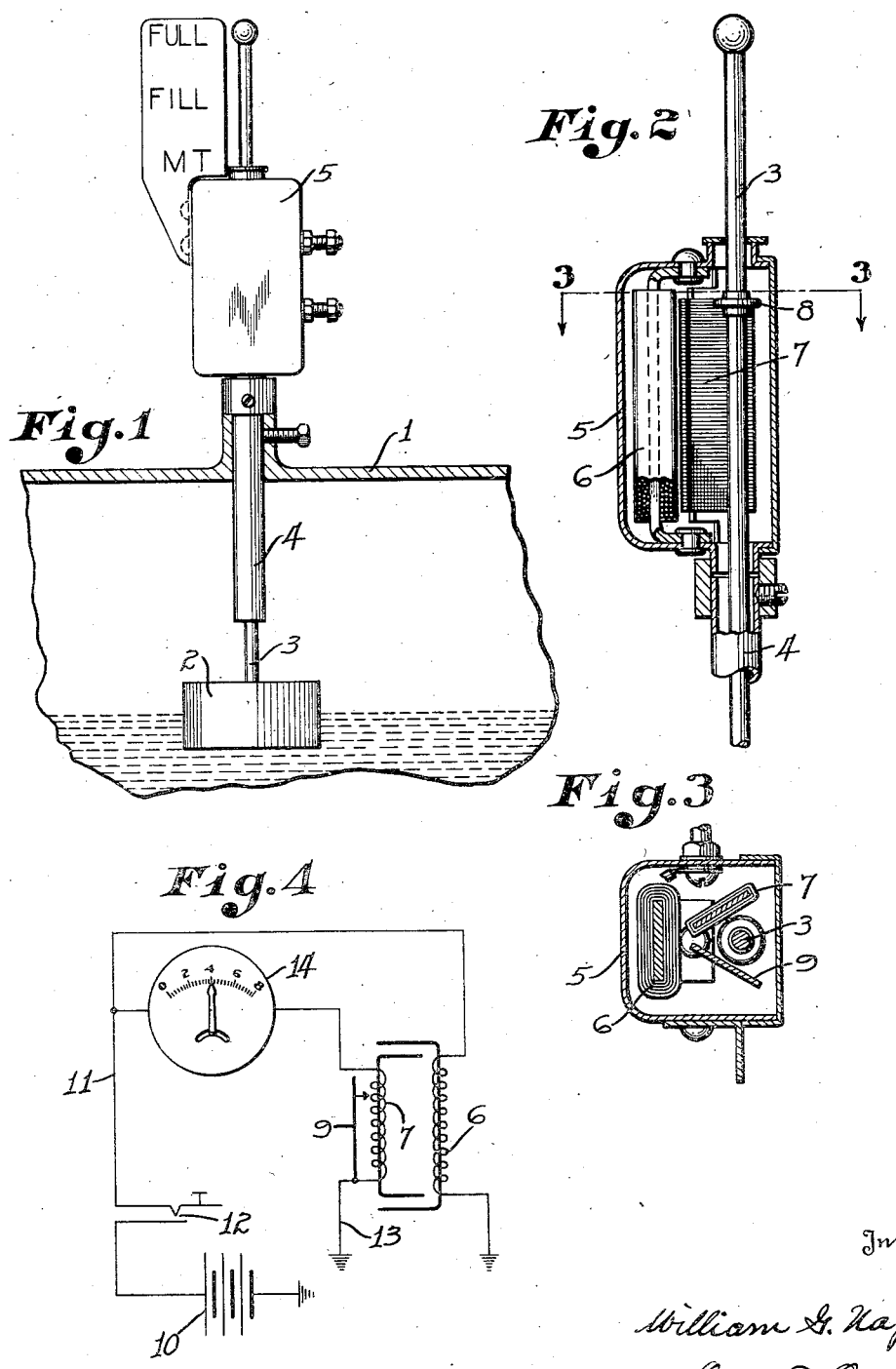

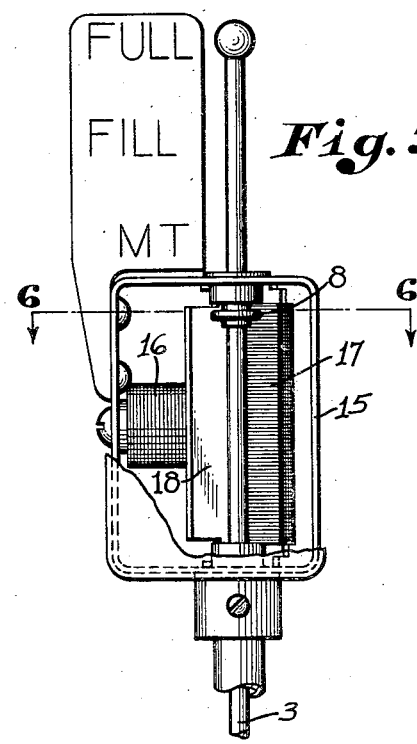
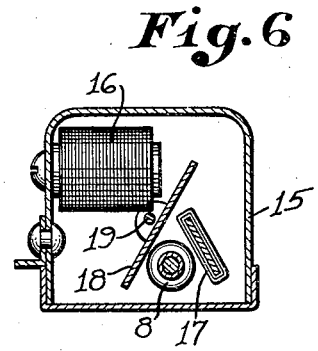
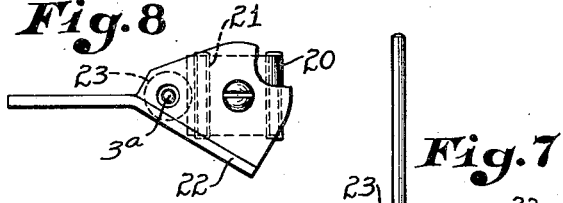
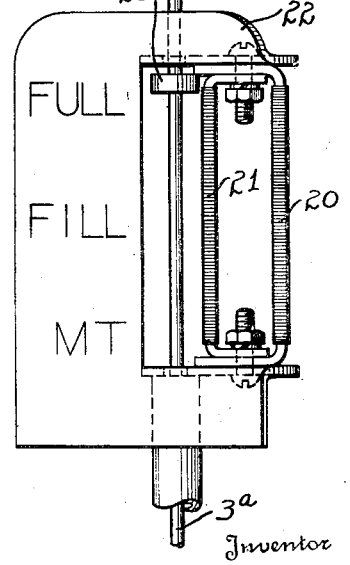
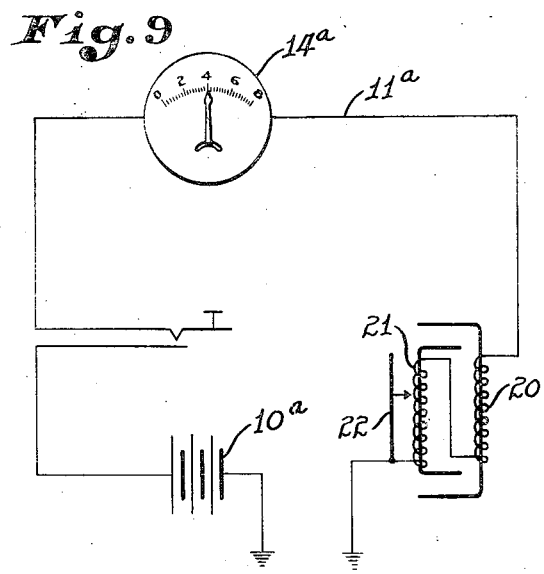

Oct. 9, 1934.  W. G. NAGEL  1,976,266
AUXILIARY LIQUID LEVEL INDICATING MEANS
Filed March 7, 1932  3 Sheets-Sheet 3
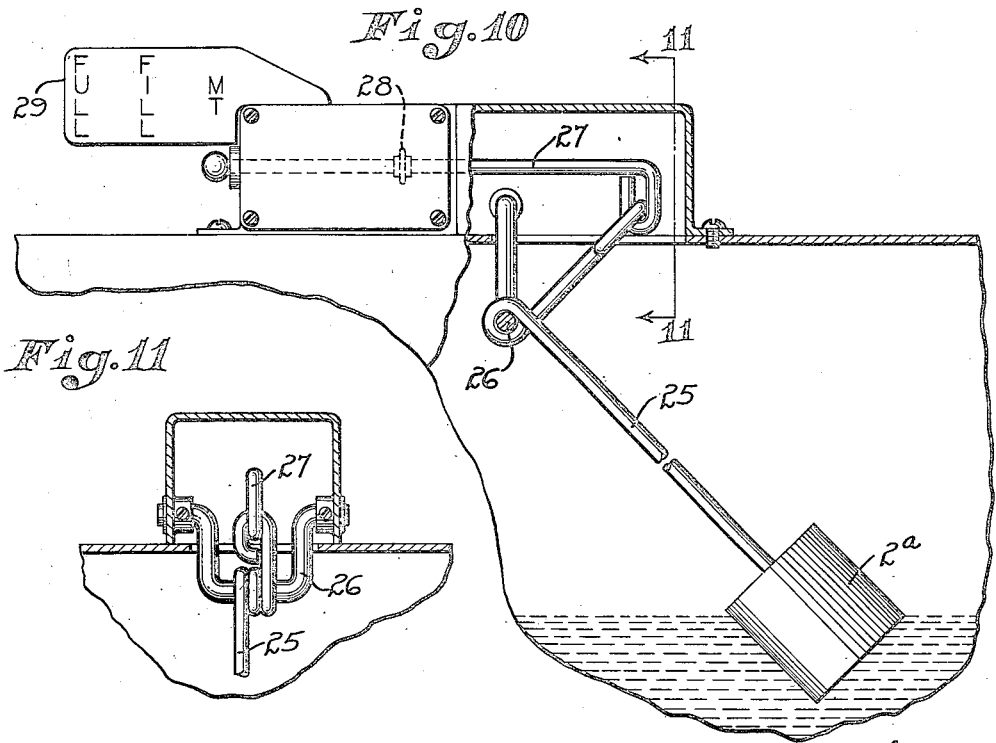
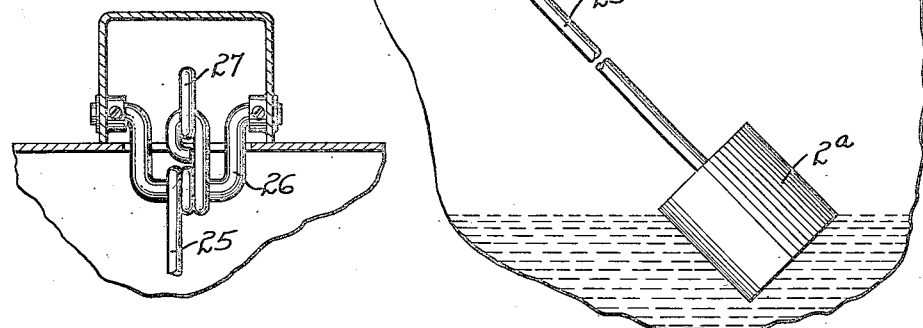
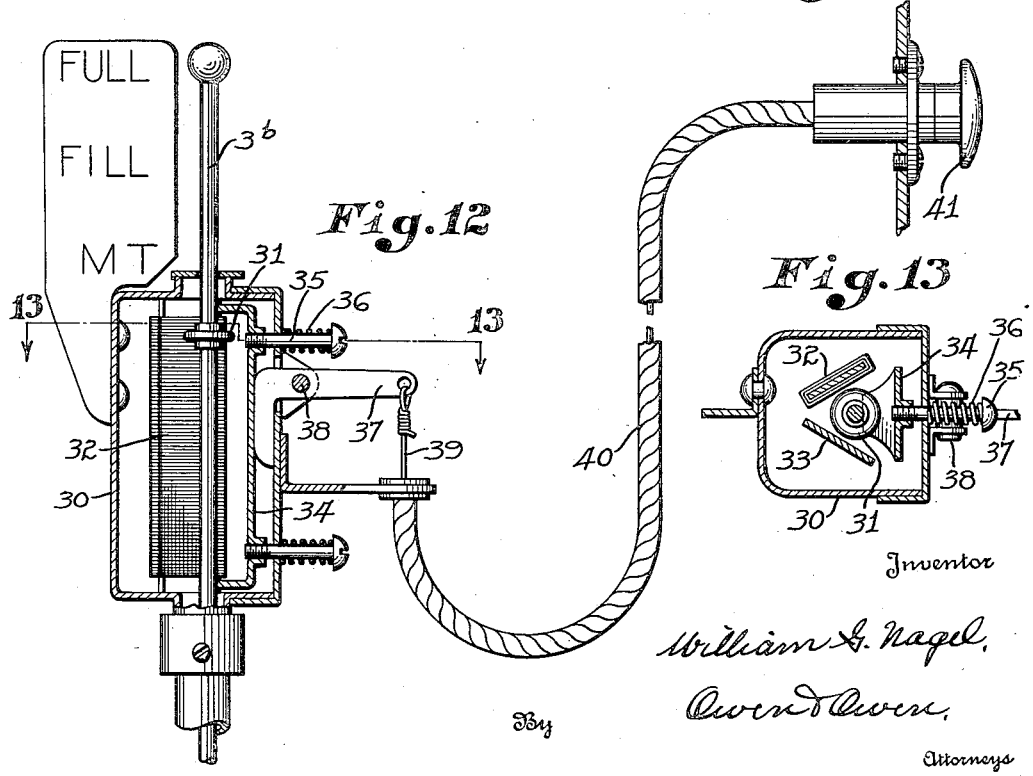

Patented Oct. 9, 1934

1,976,266

UNITED STATES PATENT OFFICE 1,976,266

AUXILIARY LIQUID LEVEL INDICATING MEANS

William G. Nagel, Toledo, Ohio, assignor, by mesne assignments, to The Commerce Guardian Bank, Toledo, Ohio, as trustee Application March 7, 1932, Serial No. 597,206

5 Claims. (Cl. 177—351)

This invention relates primarily to liquid level indicators of the float-operated type, and more particularly to means for use in connection with such indicators, whereby the indicators may be permitted to function in their normal way or may, as desired, be caused to cooperate with said means to indicate at a remote point, or at a point different from the normal point of reading of the indicator and in addition thereto, the level of the liquid being measured.

In electrically controlled liquid level gages, as at present generally constructed, the indicator circuit is through float-operated means, which makes sliding contact with a stationary resistance element, so that the amount of resistance in the circuit and the consequent position of the indicator varies in accordance with the level of the liquid. If there is a good contact between the co-acting sliding parts, it inevitably causes a frictional resistance which impedes the movement of the float, so that the reading of the indicator is not accurate. Furthermore, on account of the presence of such frictional resistance, it has been found impractical to employ electrically controlled indicating means of the float-operated type in connection with lubricating oils and other liquids of a viscous nature. For instance, in liquid level indicators of the float-operated type used in connection with the crank-cases of internal combustion engines, to indicate the level of oil therein, it is important, due to the low buoyancy of the liquid and its tendency to gum up the parts with which it comes in contact, to provide an indicator which will offer as little resistance to the movement of the associated float as possible. For this reason, it has been customary to employ float-operated crank-case oil indicators of a very simple type, ordinarily comprising merely a float, a float-rod, and a scale at one side of the rod. With this type of indicator, a reading has only been possible at the point where the float-rod is located, thus, in the case of automobile engines, requiring a raising of the engine hood to determine the level of the oil in the crank-case.

The primary object of the invention is the provision of means, auxiliary to and normally separate from a liquid level indicator of the float-operated crank-case type and operable at will to cooperate with the float-rod, or an element movable by the float to indicate at a remote point, for instance, at the instrument board of an associated automobile, the level of the crank-case oil determined by the then position of the float-actuated rod or element.

A further object of the invention is the provision of means which is separate from and auxiliary to an associated liquid level indicating means and does not interfere with the normal functioning or reading thereof, but which is operable, as desired, to cooperate with said indicating means and indicate at a remote point the level of the liquid at such time.

A further object of the invention is the provision of means of the character described, which only consumes electric current when momentarily operated to permit a reading to be taken.

The invention is fully described in the following specification, and while in its broader aspect it is capable of embodiment in numerous forms, and of being associated with liquid level indicators of various types and constructions, a few embodiments only of the invention are illustrated in the accompanying drawings, in which—

Figure 1 is a front elevation of a portion of the means embodying my invention, operatively associated with a float-operated liquid level indicating rod. Fig. 2 is a section on the line 2—2 in Fig. 1. Fig. 3 is a cross-section on the line 3—3 in Fig. 2. Fig. 4 is an electric wiring diagram employed in connection with this form of the invention. Fig. 5 is a view similar to Fig. 1, with a part of the casing broken away, of a slightly different form of the invention. Fig. 6 is a cross-section on the line 6—6 in Fig. 5. Fig. 7 is an elevation of another form of the invention. Fig. 8 is a plan view of the form shown in Fig. 7, with a part broken away. Fig. 9 is a wiring diagram which may be used in connection with the form shown in Fig. 7. Fig. 10 illustrates the attachment in connection with a different form of float-operated liquid level gage. Fig. 11 is a section on the line 11—11 in Fig. 10. Fig. 12 is an elevation of a different form of the invention, with parts broken away, and employing a manually operable, as distinguished from an electrically operable, means for rendering the attachment operative for a remote reading, and Fig. 13 is a cross-section on the line 13—13 in Fig. 12.

Referring to the drawings, and particularly Fig. 1, 1 designates a liquid container, which may constitute the crank-case of an internal combustion engine, 2 a float supported by the liquid in the container and adapted to rise and fall therewith, and 3 a float-rod carried by, and in the present instance extending up through a guide-opening in the top of the container for free reciprocatory movements therein, said guide-opening in the present instance being formed by a tubular part 4 projecting slightly from the top of the container. The rod 3 either has its upper end, or some designating point thereon, registering with a level indicator at one side of the exposed portion of the rod to indicate various levels of the liquid in the container, as for instance, by the designations "Full", "Fill", etc., commonly employed in connection with crankcase liquid level gages.

In one form of my invention, I mount a case 5 on the liquid container around the exposed portion of the rod 3 and provide in such case an electro-magnet 6 and an electrical resistance unit 7, the latter being substantially parallel to the longitudinal axis of the rod 3 and adapted to have its resistance coil engaged by a contact button 8 on the rod when the rod is laterally moved from normal upright position for such purpose.

The movement of the rod to effect engagement of the contact 8 with the resistance coil 7 is effected by the energizing of the electro-magnet 6, the magnetic forces acting on the rod 3 as an armature to draw the member 8 into contact with the resistance coil. The resistance unit 7 cooperates with a grounding plate 9 to form a V-shaped recess in which the rod 3 is disposed with the apex of the V adjacent to the electro-magnet, so that when the rod is attracted by an energization of the magnet, the contact 8 of the rod will be drawn into contact with both the resistance unit and the grounding plate to effect a close contact with each. The plate 9 is connected to the case 5, so that grounding of the current may be effected through the case and its mounting.

Referring to the diagram shown in Fig. 4, 10 designates the battery grounded at one side and having its other side connected through a lead 11 and a normally open manually controlled switch 12 to one end of the coil of the electro-magnet 6, the opposite end being grounded, as shown. The coil of the resistance unit 7 has one end grounded, as shown at 13, and its other end connected to the battery lead 11 through an ammeter unit 14, which serves as the indicator of the device to designate the level of the liquid being measured.

In the form of the invention shown in Figs. 5 and 6, an armature is interposed between the electro-magnet and contact member on the float-rod, and is movable by an energizing of the magnet to coact with the rod or its contact element and move the latter into contact with the resistance unit, the armature being rockable for such purpose. In this form, 15 designates the enclosing case for the operating parts and through which the float-rod 3 projects, 16 the electro-magnet, 17 the resistance member, parallel with one face of which the float-rod 3 is longitudinally movable, and 18 the armature, which is pivoted at 19 and cooperates with the resistance unit to form a V recess in which the rod is disposed. When the armature is energized, it coacts with the contact button 8 of the float-rod to force it into contact with the resistance unit. In this case, the short circuit of a portion of the resistance coil with the ground may take place through the armature 8, which has grounding connection with the case, or in any other suitable manner.

In the form shown in Figs. 7 and 8, 20 designates the electro-magnet and 21 the resistance member, which magnet and member may have a common mounting on a frame part 22, as shown, with the axis of the electro-magnet coil and the contacting face of the resistance element parallel to the longitudinal movement of the float-rod designated 3ᵃ. The contact element 23 on the float-rod may also serve as the armature, which is attracted by an energizing of the electro-magnet. It is apparent that upon an energizing of the electro-magnet, the contact 23 will be moved from normal position into contact with the resistance coil 21, thereby shunting a portion of such coil in any suitable manner.

In this form, referring to the wiring diagram in Fig. 9, the resistance and electro-magnet coils are in series and the ammeter or indicating instrument 14ᵃ is in the lead 11ᵃ between the battery 10ᵃ and the electro-magnet coil. The form of wiring shown in Fig. 4, wherein the coils of the electro-magnet and resistance unit are in parallel, is preferable to the form illustrated in Fig. 9, wherein said coils are in series, as the former is more sensitive in its action than the latter.

In Figs. 10 and 11, the float-actuated element carrying the contact with which the resistance element coacts, is shown as constituting an element which is not directly connected to the float, but is movable by the float in a direction which is angularly disposed with respect to a perpendicular. In this case, the float 2ᵃ is carried by a bell-crank rocker member 25, mounted for vertical rocking movements on a member 26 and having one arm connected to a horizontally movable member 27 to communicate reciprocatory movements thereto from rocking movements of the bell-crank. The rod 27 carries a contact 28 for cooperating with an auxiliary liquid level indicating mechanism, such, for instance, as any of those above described, to indicate at a remote point, the level of the liquid being measured when the contact 28 and associated resistance unit are brought into coacting relation. The member 27 also acts in conjunction with an indicator plate 29 to designate the level of the associated liquid, as well understood in the art.

With each form of the invention so far described, the ammeter or electrically actuated indicating instrument 14 or 14ᵃ and the control switch 12 of the electrical operating circuit may be disposed at any desired remote position with respect to the location of the liquid being measured, as, for instance, on or adjacent to the instrument board of an automobile, so that the operator may determine the quantity condition of the liquid being measured by merely closing the switch and noting the reading on the indicating instrument. The operator may also, if he desires, determine the level of the liquid in the usual manner, as, for instance, by raising the hood of the automobile and noting the position of the float-rod.

If desired, some other means to render the auxiliary liquid level indicating means operative may be substituted for the electrical control means, as, for instance, a manually operable mechanical means such as illustrated in Figs. 12 and 13 may be employed for this purpose. In this form of the invention, the electro-magnet and its wiring are omitted and the rod contact, such as 8, of the form shown in Fig. 2, is mechanically moved into contact with the resistance unit and grounding plate. In this form of the invention, 30 designates the case through which the float-rod 3ᵇ projects for their reciprocatory movements, 31 the contact member on the rod, 32 the resistance element, and 33 the grounding plate. A U-shaped yoke member 34 is disposed within the case at one side of the float-rod, with its legs normally out of engagement with the same. The yoke is carried and guided in its movements by headed stems 35 projecting through guide-openings in the case and encircled without the case by coiled compression springs 36 which coact with the headed ends of the stems and with the case to normally retain the yoke retracted with respect to the float-rod. A lever 37 is pivoted to the case at 38 and has one arm angled and projecting into the case lengthwise of the yoke 34 in engagement therewith, so that a movement of the lever from normal position will force the yoke into engagement with the float-rod and move the latter to place its contact 31 in engagement with both the resistance unit 32 and grounding plates 33. A pull member 39 extends from the outer end of the lever 37 through a guide-conduit 40 to a pull member 41 disposed within convenient reach of the operator, whereby a pull on such member will effect a movement of the lever 37 to move the contact 31 in engagement with the resistance member.

It is apparent that I have provided an auxiliary indicating means, which is normally separated from a primary float-operated indicating means to permit free normal operation of the latter to designate the level of a liquid being measured and which is adapted to be placed in operating connection with said primary means to indicate, at a point different from the point of indication of said primary means, the level of the liquid being measured, whereby said indicating reading may be had at one or more points as conditions may require.

I wish it understood that my invention is not limited to any specific construction, arrangement or form of the parts, as it is capable of numerous modifications and changes without departing from the spirit of the claims.

Having thus described my invention, what I claim as new and desire to secure by United States Letters Patent is:

1. In a liquid level indicator, a float operated stem movable axially in response to variations in the liquid level, an electric circuit including an electrical measuring device, a source of electrical energy having one side grounded and a resistor, a contact carried by said stem adjacent said resistor, a grounded deflecting plate angularly disposed to said resistor and cooperating therewith to form a V-shaped volume, and magnetic biasing means to draw said contact laterally into the vertex of the V against said deflecting plate and said resistor, whereby a portion of said resistor is short-circuited and the position of said contact on said resistor is indicated on said electrical measuring device.

2. In a liquid level indicator, a float operated stem movable longitudinally in response to variations in the liquid level, an electric circuit including a source of electrical energy, a resistor, an electrical measuring device, and means in series with said source of electrical energy angularly disposed with relation to said resistor and cooperating therewith to define a convergent volume, a contact carried by said stem and included in said convergent volume, and means to cause said contact to move laterally into the vertex of said convergent volume against said resistor and said first mentioned means, whereby a portion of said resistor is short-circuited and the position of said contact on said resistor is indicated on said electrical measuring device.

3. In a liquid level indicator having a grounded portion, a float operated movable longitudinally in response to variations in the liquid level, an electric circuit including an electrical measuring device, a source of electrical energy having one side grounded, a resistor, a contact carried by said stem adjacent said resistor, and magnetic biasing means to draw said stem and contact into engagement with said resistor and the grounded portion of said indicator, whereby a portion of said resistor is short-circuited and the position of said contact on said resistor is indicated on said electrical measuring device.

4. In a liquid level indicator, a float operated stem movable longitudinally in response to variations in the liquid level, a scale adjacent said stem to directly indicate the level of said liquid, an electric circuit including an electrical measuring device, a source of electrical energy having one side grounded and a resistor, a contact carried by said stem adjacent said resistor, a grounded deflecting plate angularly disposed to said resistor and cooperating therewith to form a V-shaped volume, and magnetic biasing means to draw said contact laterally into the vertex of the V against said deflecting plate and said resistor, whereby a portion of said resistor is short-circuited and the position of said contact on said resistor is indicated on said electrical measuring device.

5. In a liquid level indicator, a float operated stem movable longitudinally in response to variations in the liquid level, an electric circuit including an electrical measuring device, a source of electrical energy having one side grounded, and a resistor, a grounded element disposed adjacent said resistor, a contact carried by said stem, and magnetic biasing means to draw said contact laterally into wiping connection with said resistor and said grounded element, whereby a portion of said resistor is short-circuited and the position of said contact on said resistor is indicated on said electrical measuring device

WILLIAM G. NAGEL.

CERTIFICATE OF CORRECTION.

Patent No. 1,976,266.                                                                                         October 9, 1934.

WILLIAM G. NAGEL.

It is hereby certified that error appears in the printed specification of the above numbered patent requiring correction as follows: Page 3, line 92, claim 3, after "operated" insert the word stem; and that the said Letters Patent should be read with this correction therein that the same may conform to the record of the case in the Patent Office.

Signed and sealed this 8th day of January, A. D. 1935.

Leslie Frazer (Seal)                                                        Acting Commissioner of Patents.